US009951616B2

(12) United States Patent
Uotila et al.

(10) Patent No.: US 9,951,616 B2
(45) Date of Patent: Apr. 24, 2018

(54) ARRANGEMENT FOR CONTROLLING AUTOMATED OPERATION MODE

(71) Applicant: SANDVIK MINING AND CONSTRUCTION OY, Tampere (FI)

(72) Inventors: Jarkko Uotila, Tampere (FI); Petri Nurminen, Tampere (FI); Jari Talasniemi, Tampere (FI)

(73) Assignee: SANDVIK MINING AND CONSTRUCTION OY, Tampere (FI)

(*) Notice: Subject to any disclaimer, the term of this patent is extended or adjusted under 35 U.S.C. 154(b) by 0 days.

(21) Appl. No.: 14/900,807

(22) PCT Filed: Mar. 28, 2014

(86) PCT No.: PCT/EP2014/056294
§ 371 (c)(1),
(2) Date: Dec. 22, 2015

(87) PCT Pub. No.: WO2014/206587
PCT Pub. Date: Dec. 31, 2014

(65) Prior Publication Data
US 2017/0037725 A1 Feb. 9, 2017

(51) Int. Cl.
E21C 35/24 (2006.01)
E21B 47/00 (2012.01)
E21B 1/00 (2006.01)
B25D 9/26 (2006.01)
G05D 1/00 (2006.01)
E21B 7/02 (2006.01)

(52) U.S. Cl.
CPC ............ E21C 35/24 (2013.01); B25D 9/26 (2013.01); E21B 1/00 (2013.01); E21B 7/022 (2013.01); E21B 7/025 (2013.01); E21B 47/00 (2013.01); G05D 1/0011 (2013.01); G05D 1/0088 (2013.01)

(58) Field of Classification Search
None
See application file for complete search history.

(56) References Cited

U.S. PATENT DOCUMENTS

2001/0050186 A1 12/2001 Wilson et al.
2003/0015351 A1 1/2003 Goldman et al.
2009/0078438 A1 3/2009 Muona
(Continued)

FOREIGN PATENT DOCUMENTS

CN 101663463 A 3/2010
CN 102782241 A 11/2012
(Continued)

Primary Examiner — Russell Frejd
(74) Attorney, Agent, or Firm — Connie R. Gorski

(57) ABSTRACT

A method for controlling an automated drilling process on a work machine includes the steps of obtaining, from at least one input, data determining operations of the work machine; generating reference data based on the data determining previous operations of the work machine in substantially the same area; detecting a region of interest in the reference data; and controlling, in response to the work machine or its drilling process approaching a point corresponding to the region of interest in the reference data, the work machine to provide an operator with an option to manually assist the operations of the work machine at the point.

15 Claims, 2 Drawing Sheets

(56) References Cited

U.S. PATENT DOCUMENTS

| | | | | |
|---|---|---|---|---|
| 2009/0240481 | A1* | 9/2009 | Durrant-Whyte | G06Q 10/06 703/7 |
| 2009/0250263 | A1 | 10/2009 | Saha | |
| 2010/0174514 | A1* | 7/2010 | Melkumyan | G06F 17/18 703/2 |
| 2012/0179322 | A1* | 7/2012 | Hennessy | G05D 1/0278 701/25 |
| 2012/0179635 | A1* | 7/2012 | Vasudevan | G06T 7/521 706/12 |
| 2012/0323495 | A1* | 12/2012 | Zhou | G06T 17/05 702/9 |
| 2013/0060458 | A1 | 3/2013 | Makela et al. | |

FOREIGN PATENT DOCUMENTS

| | | |
|---|---|---|
| DE | 4445420 C1 | 11/1995 |
| WO | 03048524 A1 | 6/2003 |
| WO | 2005071225 A1 | 8/2005 |
| WO | 2007000488 A1 | 1/2007 |
| WO | 2008078001 A1 | 7/2008 |
| WO | 2008078002 A1 | 7/2008 |
| WO | 2008125735 A1 | 10/2008 |
| WO | 2008129128 A1 | 10/2008 |
| WO | 2012072870 A1 | 6/2012 |

\* cited by examiner

ARRANGEMENT FOR CONTROLLING AUTOMATED OPERATION MODE

RELATED APPLICATION DATA

This application is a § 371 National Stage Application of PCT International Application No. PCT/EP2014/056294 filed Mar. 28, 2014.

FIELD OF THE INVENTION

The present invention relates to work machines, and more particularly to controlling the automated operation mode of a work machine.

BACKGROUND OF THE INVENTION

Various mining vehicles, such as rock drilling equipment, loading equipment and transport equipment, are used in a mine. Mining vehicles may be manned or unmanned. Unmanned mining vehicles may be remote-controlled by an operator from a control station, for instance, and they may be equipped with measuring instruments suitable for location determination. Unmanned mining vehicles may be operated automatically, e.g. driven along a desired route in the mine, as long as the location of the device can be determined. The automated operation may be carried out in a surface or underground operating area.

An automatically operated mining vehicle may encounter an unexpected condition, which may necessarily not be tackled by the automated settings of the mining vehicle. Examples of such unexpected conditions may comprise locations in a hole being drilled comprising water or a fracture and locations where the properties of the rock material suddenly change. Such unexpected conditions may also relate to obstacles hindering the mining vehicle from moving in a desired direction. Typically, when an automatically operated mining vehicle encounters such unexpected condition, the automated operation is interrupted, the mining vehicle is stopped and possibly the operator at the remote control station is notified by an alarm. The operator may then take over the mining vehicle to remote manual operation and solve the problem causing the interruption of the automated operation by operating the mining vehicle manually over the unexpected condition.

However, taking over the mining vehicle to remote manual operation requires further operations of shutting down the automated operation mode and establishing a remote control channel to the mining vehicle in order to operate the mining vehicle manually. On the other hand, taking over the mining vehicle to remote manual operation mode during the automated operation mode causes the mining vehicle to stop its operation immediately. Any such interruptions reduce the efficiency of the mining operations. Partly for this reason, operators at the remote control station tend to allow the automated operation mode to continue until an unexpected condition is encountered, thereby possibly causing the mining vehicle to stop. However, the automated operation mode may have caused the mining vehicle to end up to a very difficult situation, and solving the problem caused thereby manually may take a long time.

SUMMARY OF THE INVENTION

An improved method and technical equipment implementing the method has now been developed for controlling the automated operation mode of the mining vehicle. Various aspects of the invention include a method, a working machine and a computer program product, which are characterized by what is stated in the independent claims. Various embodiments of the invention are disclosed in the dependent claims.

According to a first aspect, there is provided a method for controlling an automated drilling process on a work machine, the method comprising: obtaining, from at least one input, data determining operations of the work machine; generating a reference data based on the data determining previous operations of the work machine in substantially the same area; detecting a region of interest in the reference data; and controlling, in response to the work machine or its drilling process approaching a point corresponding to the region of interest in the reference data, the work machine to provide an operator with an option to manually assist the operations of the work machine at said point.

According to an embodiment, the method further comprises controlling, in response to a manually assisted operation carried out by the operator being completed, the work machine to continue the automated drilling process.

According to an embodiment, the manually assisted operation comprises, in response to providing said option to a remote operator, establishing a control channel between a control station and the work machine; receiving manually submitted control commands via said control channel at the work machine; and disconnecting said control channel such that the automated drilling process is continued.

According to an embodiment, the operator carries out the manually assisted operation at a cabin of the work machine.

According to an embodiment, the manually assisted operation comprises determining one or more functionalities for assisting the operations of the work machine at said point; providing the remote operator with said one or more functionalities as options to select; in response to the remote operator selecting one of said functionalities, carrying out control operations according to the selected functionality at the work machine; and continuing the automated drilling process.

According to an embodiment, the control operations according to the selected functionality comprise at least one of the following:
   automatically switching off suction of drilling cuttings in response to the reference data indicating the drilling process of the hole being drilled approaching a point comprising water;
   automatically moving a suction head up or down according to the expected rock conditions and/or expected points comprising water;
   reducing drilling feed power in response to the reference data indicating the drilling process of the hole being drilled approaching a void;
   adjusting drilling feed power and/or percussion to be suitable for expected type of rock material;
   changing the drilling control mode and/or the drilling control parameters according to the expected rock conditions.

According to an embodiment, the control operations according to the selected functionality comprise changing navigation route of the work machine in response to at least one of the following:
   detecting a forbidden area on a planned route;
   detecting the work machine to be too inclined;
   detecting a difficult position on a planned route.

According to an embodiment, the control operations according to the selected functionality comprise manually assisting in providing ground support of the work machine in response to at least one of the following:
  detecting the ground around the work machine to be too inclined or slippery to support;
  detecting the work machine to be too inclined to support;
  detecting at least one support of the work machine being incorrectly supported.

According to an embodiment, the control operations according to the selected functionality comprise manually assisting positioning the work machine in response to at least one of the following:
  obtaining a pre-warning of collision;
  detecting a feed beam touching ground;
  detecting a feed beam leaning on a tunnel wall;
  detecting at least one of the joints of the work machine not following correctly.

According to an embodiment, the method further comprises storing one or more sets of drilling parameters, drilling control modes and/or drilling control parameters in a memory of the work machine; linking said set of drilling parameters, said drilling control mode and/or said drilling control parameter to one or more drilling conditions, where such parameters or control modes are suitable to use; and in response to the reference data indicating the drilling process of the hole being drilled approaching a specific drilling condition, retrieving from the memory a set of drilling parameters, a drilling control mode and/or a drilling control parameter suitable for said drilling condition to be used in said control operations.

According to an embodiment, the method further comprises storing one or more sets of navigation parameters in a memory of the work machine; linking said set of navigation parameters to one or more propagation conditions, where such parameters are suitable to use; and in response to the reference data indicating the navigation route of the work machine approaching an obstacle, retrieving from the memory a set of navigation parameters suitable for propagation to be used in said control operations.

According to an embodiment, said manually assisted operation relates only to a sub-process of the automated drilling process, and the method further comprises continuing other sub-processes of the automated drilling process of the work machine while the operator carries out said manually assisted operation.

According to an embodiment, the data determining operations of the work machine is one or more of the following:
  measurement data obtained from one or more sensors of the work machine;
  measurement data obtained from at least one other work machine;
  user data submitted by an operator of at least one work machine describing operation conditions of an operating area and/or the work machine.

According to a second aspect, there is provided a work machine arranged to carry out an automated drilling process, the work machine comprising: at least one input for obtaining data determining operations of the work machine; a control system arranged to generate a reference data based on data determining previous operations of the work machine in substantially the same area, the control system being further arranged to detect a region of interest in the reference data; and control in response to the work machine or its drilling process approaching a point corresponding to the region of interest in the reference data, the work machine to provide an operator with an option to manually assist the operations of the work machine at said point.

According to a third aspect, there is provided a computer program product, stored on a non-transitory memory medium, comprising computer program code for carrying out a control process of a work machine, the computer program code which, when executed by a processor, causes the work machine to perform: obtaining, from at least one input, data determining operations of the work machine; generating a reference data based on the data determining previous operations of the work machine in substantially the same area; detecting a region of interest in the reference data; and controlling, in response to the work machine or its drilling process approaching a point corresponding to the region of interest in the reference data, the work machine to provide an operator with an option to manually assist the operations of the work machine at said point.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a schematic representation of a rock drilling apparatus as an example of a work machine suitable for implementing the embodiments of the invention;

DESCRIPTION OF EMBODIMENTS

The presently disclosed embodiments are applicable, in particular, to various remotely operatable work machines used in mining industry. Particular examples of such work machines are mining and construction apparatuses, such as various mobile rock drilling machines. A mining apparatus may be a mobile mining apparatus, which may be referred to as a mining vehicle, or a stationary mining apparatus. It should also be noted that, in general, a mining apparatus may also refer to various machines used for rock excavation in a surface or underground operating area. In this context, the term "rock" is to be understood broadly to cover also a boulder, rock material, crust and other relatively hard material.

Figure 1:
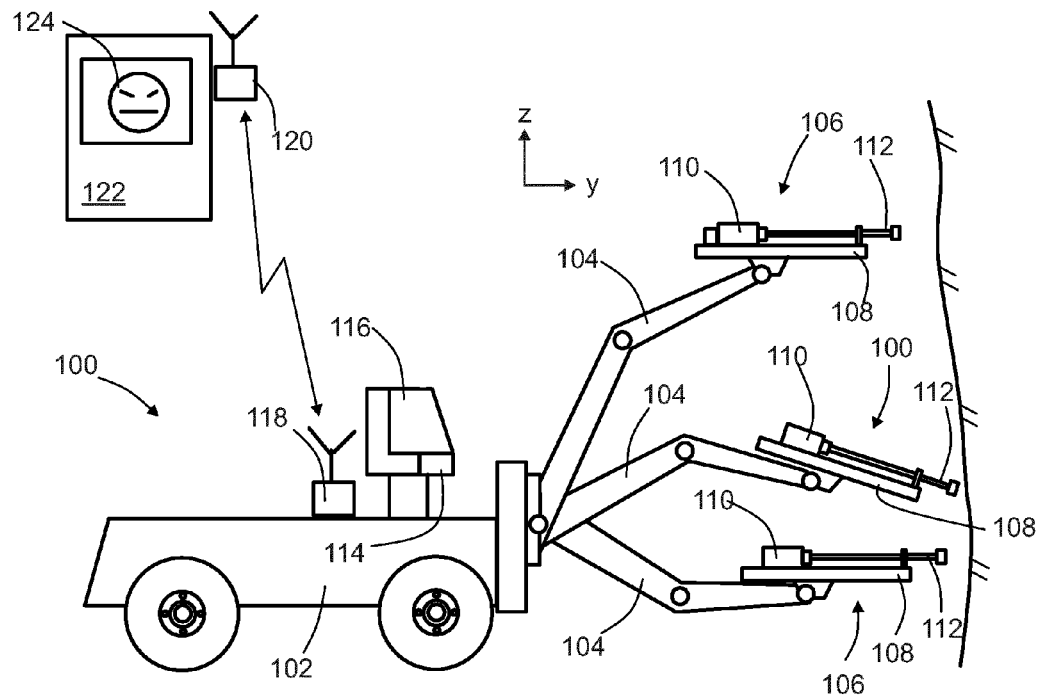

FIG. 1 shows an example of a rock drilling apparatus 100, such as a rock drilling rig comprising a movable carrier 102, one or more drilling booms 104 and drilling units 106 arranged in the drilling booms 104. The drilling unit 106 comprises a feed beam 108 on which a rock drill 110 can be moved by means of a feed motor (not shown in FIG. 1). Further, the drilling unit 106 comprises a tool 112 with which the impact pulses given by a percussion device (not shown in FIG. 1) of the rock drill 110 are transmitted to the rock to be drilled. The rock drilling apparatus typically comprises a plurality of pumps (not shown in FIG. 1) for generating hydraulic pressure for operating various parts of the apparatus, for pumping drilling fluid for lubricating, cooling, and cleaning a drilling bit, and for pumping rock cuttings from the drill holes.

The rock drilling rig 100 further comprises at least one control unit 114 arranged to control actuators of the rock drilling rig 100, the actuators being arranged in a first control system. The control unit 114 may be a computer or a corresponding device, and it may comprise a user interface with a display device as well as control means for giving commands and information to the control unit 114. The control unit 114 and its user interface are typically located within a cabin 116 of the rock drilling apparatus 100.

Further, the rock drilling apparatus 100 may have a data transfer unit 118, with which the control unit 112 may establish a data transmission connection to a second control system external to the rock drilling apparatus 100 by utilising a wireless connection provided by a base station 120. The second control system may reside at a control station 122 that may be arranged outside the mine. The control systems may be computers equipped with appropriate software. A remote operator 124 may monitor and control the operations of the rock drilling apparatus 100 via the wireless connection.

FIG. 1 is a simplified figure, and the control system of a mining vehicle, such as the rock drilling apparatus 100, typically comprises several units for implementing different control functions. The control system of the mining vehicle may be a distributed entity consisting of modules connected to a CAN (Controller Area Network) bus, for example, and managing all measurements and controls of the machine. The information system of the control station 122 may also comprise one or more servers, databases, operator workstations and a connection to other networks and systems.

The rock drilling rig of FIG. 1 is disclosed herein only as an example of a mining vehicle where the embodiments disclosed herein may be implemented. The embodiments are equally applicable to any other mining vehicles, such as various loading and transport equipment used in mines.

Despite of whatever mining vehicle is used, the control system of the mining vehicle preferably comprises a positioning system or unit. Various methods may be used for determining the location of the mining vehicle, for example, depending on whether the mining vehicle is used in surface drilling or in underground drilling. In surface drilling, it is possible to use satellite navigation, such as the GPS system, for determining the location and orientation of the mining vehicle with sufficient accuracy.

In underground drilling, the location of the mining vehicle may be determined using a tachymetry process. A sufficient number of navigation points with predetermined locations, for example in a tunnel to be excavated, are used for linking a tachymeter to the xyz coordinate system to be used. The mining vehicle is provided with targets, the locations of which in relation to the origin of the coordinate system of the mining vehicle have been determined. The tachymeter is used for continuously measuring the xyz coordinates of the targets. Moreover, at least one point of the drilling pattern is determined in a level of navigation. On the basis of these data, possibly together with a curvature table, the length of the drilling pattern and the inclination of the mining vehicle, the mining vehicle may determine its location and the location and the orientation of the drilling pattern.

Furthermore, regardless of whether a satellite navigation or a tachymetry process is used for determining the location of the mining vehicle, the mining vehicle and its sub-units, such as the drilling apparatus having its booms and drilling unit, are preferably provided with sufficient number of sensors, such as gyroscopes, compass sensors, inclinometers, rotary encoders, linear encoders and accelerometers, for ensuring sufficient hole position accuracy both for the feed alignment and the drilling process. As a result, when the mining vehicle navigated with sufficient accuracy carries out a drilling process according to a drilling pattern, exact locations are obtained for the drilled holes and they can be exactly located in the coordinate system of the job site to be used as future reference holes.

Thus, the operations of the mining vehicle may be remotely controlled and monitored, as well as be automated to be carried out at least partly autonomously.

The mining vehicle may further be arranged to obtain information about the operations of the mining vehicle, as well as about the area where the mining vehicle is operating. In the field of mining vehicles, an automated drilling process generally refers to any operations, by which the mining vehicle is moved in its operating area, positioned as exactly as possible to a hole to be drilled and carries out the drilling process.

For example, the rock drilling apparatus 100 may be provided with various sensors to detect states of actuators and/or to measure conditions of different parts of the apparatus and possibly to take measurements about the environment. The sensors may include various types of pressure sensors, accelerometers, magnetometers, temperature sensors, etc. capable of providing real-time measurements about the drilling process in general, particularly about the conditions at the drill bit on one hand, and about the properties of geological formation on the other hand. These real-time measurements are referred to as measurement-while-drilling (MWD) or logging-while-drilling (LWD).

On the basis of the measurements from the sensors, MWD may provide drilling mechanics information. The information provided by MWD about the conditions at the drill bit may include, for example, rotational speed of the drill, smoothness of the rotation, rotating pressure, pressure on the percussion piston, torque and weight on the drill bit, vibration type of the drill bit, temperature in the hole, energy of percussion and rotation per drilled volume/length, penetration per impact, penetration per bit revolution, rotation torque, feed force, rotation-feed pressure ratio, feed pressure-penetration rate ratio, etc.

Furthermore, measurements may be made for obtaining a detailed record (log) of the geologic formations penetrated by a drill hole. In such measurements, information about geological characteristics around the drill hole, such as density, porosity, cleavage, resistivity, fractioning, magnetic resonance and formation pressure, are obtained.

Instead of or in addition to measurement information obtained from the rock drilling apparatus, there may be a separate measurement system arranged to obtain one or more types of information regarding the drilling mechanics and/or the geologic formations. Such separate measurement system may be functionally connected to the rock drilling apparatus, for example, for transferring the measurement information to the rock drilling apparatus.

Depending on the field of drilling and the forum of discussion, the definitions of MWD and LWD may vary, and therefore at least some of the measurements mentioned above may sometimes be referred to as logging-while-drilling (LWD).

Typically, when starting to excavate rock, a drilling pattern is designed comprising at least the locations and the hole direction angles of the holes to be drilled in the coordinate system of the drilling pattern, as well as the lengths of the holes to be drilled. While drilling the drill holes according to the drilling pattern, the rock drilling apparatus is preferably arranged to obtain measurement data from the drilled holes. The measurement data may comprise, for example, one or more data types of the MWD and/or the LWD data mentioned above. The measurement data may also comprise various analysis data regarding, for example, the drilling dynamics and/or the geologic formations, wherein for example one or more data types of the MWD and/or the LWD are used as input data for various analysis algorithms. The measurement data may be stored on a memory medium in functional connection with the control unit.

Figure 2:
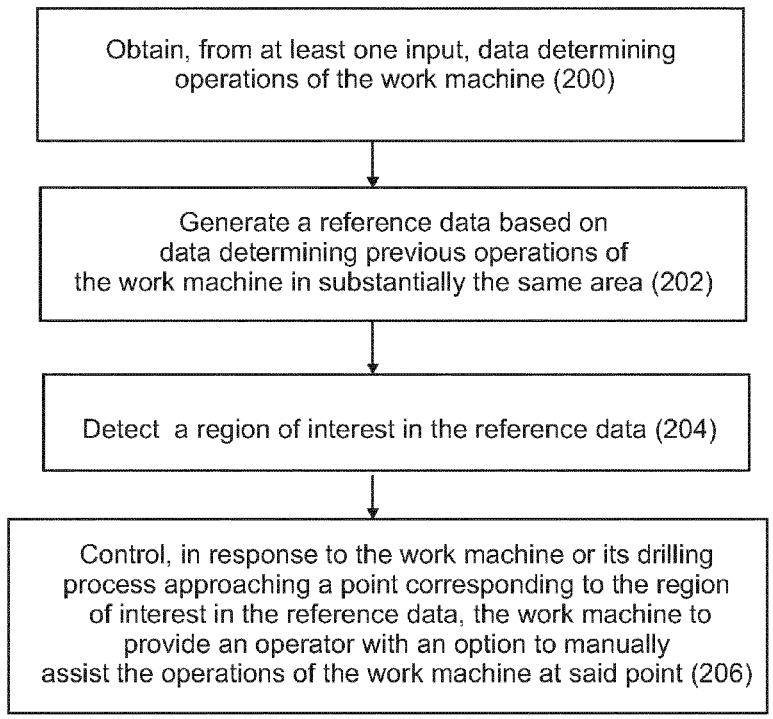
FIG. 2 shows a flow chart for a control method of a work machine according to an embodiment of the invention.

Now according to an aspect of the invention, the work machine is arranged to control the automated drilling process on the basis of the data regarding previous operations of the work machine. FIG. 2 illustrates a method for controlling an automated drilling process on a work machine, such as the rock drilling apparatus.

In the method, data determining operations of the work machine are obtained (200) from at least one input. Reference data is generated (202) based on the data determining previous operations of the work machine in substantially the same area. A region of interest is detected (204) in the reference data, and in response to the work machine or its drilling process approaching a point corresponding to the region of interest in the reference data, the work machine is controlled (206) to provide an operator with an option to manually assist the operations of the work machine at said point.

In other words, the operations of the work machine are monitored and reference data is generated on the basis of data determining previous operations of the work machine in substantially the same area. Herein, the data determining previous operations may be measurement data obtained from one or more sensors of the work machine. It is also possible to use measurement data obtained from at least one other work machine. For example, another mining vehicle may have been operating in the same operating area previously and may have gathered measurement data using its own sensors. This measurement data may be conveyed to the work machine in question e.g. via remote control station or by direct wireless transmission between the work machines.

The data determining previous operations may also be user data submitted by an operator of at least one work machine describing operation conditions of an operating area and/or the work machine. Thereby, the data may be so-called silent knowledge gathered from experience of another operator. Thus, a previous operator may have stored information relating to e.g. problematic drilling conditions at a certain location and/or depth or obstacles on a navigation route. The stored data may also relate to the work machine in question e.g. difficulties in carrying out certain operations by the work machine.

The reference data may be MWD and/or LWD data from the previously drilled one or more holes, for example. The reference data may be data received from one or more scanners or distance measuring devices about the environment of the work machine. Thus, the reference data may be data describing geological surface formations of the mine, for example in terms of its suitability for the propagation of the work machine.

The reference data may be analysed, if necessary, and a region of interest may be found in the reference data. Herein, the region of interest refers to any data or analysed information, which may have influence on the overall operation of the work machine in its current location. Especially, it may refer any data relating to a location in one or more previously drilled holes or a location derived on the basis of one or more previously drilled holes, which may have influence on the drilling process of the work machine. The region of interest may further be, for example, a region in the reference pattern, one or more holes, one or more hole depths, one or more hole depth intervals, data about detected obstacles, such as tunnel wall or loose rock, that may be relevant to the propagation of the work machine, etc.

At a moment, the operations of the work machine approach a point corresponding to the region of interest in the reference data, which may refer to the drilling process of at least one hole being drilled approaching a point corresponding to the region of interest in the reference data, the region of interest being, for example, a location comprising water or a fracture or a location where the properties of the rock material change. It may also refer to the work machine moving towards a location where a previously detected obstacle may hinder the propagation of the work machine.

When the operations of the work machine approach such a point, the work machine is controlled to provide an operator with an option to manually assist the operations of the work machine at said point. The operator may be a remote operator at a remote control station or an operator in the cabin of the work machine. In case of the remote operator, the control unit of the work machine may send a notification to the control system of the remote control station possibly arranged outside the mine. The notification may be provided on the user interface of the remote control station such that the remote operator preferably notices the notification. After considering whether the situation is such that a manually assisted operation could improve the performance of the work machine over the detected region of interest, the remote operator may initiate an appropriate manually assisted operation.

The above arrangement is similarly applicable, when the work machine is carrying out an automated drilling process such that the operator is located in the cabin of the work machine. Similarly, said notification may be provided on the user interface of the work machine such that the operator preferably notices the notification. The operator in the cabin then carries out the manually assisted operation, if considered necessary.

According to an embodiment, in response to the manually assisted operation carried out by the remote operator is completed, the work machine is controlled to continue the automated drilling process. Thus, when the remote operator has manually assisted the work machine over the detected region of interest, the work machine returns to continue the automated drilling process. Thus, no interruptions of the operation of the work machine are caused and the efficiency of the drilling process may be maintained high.

According to an embodiment, the manually assisted operation relates only to a sub-process of the automated drilling process, and other sub-processes of the automated drilling process of the work machine are continued while the operator carries out said manually assisted operation. Thus, operator may concentrate on a specific problem requiring human intervention, while the work machine otherwise may continue its automated operation.

According to an embodiment, the manually assisted operation comprises, in response to providing said option, establishing a control channel between a control station and the work machine; receiving manually submitted control commands via said control channel at the work machine; and disconnecting said control channel such that the automated drilling process is continued.

Thereby, the remote operator may be provided with the option to take control of the work machine, for example by displaying a notification on the UI of the remote station: "A cleavage approaching at the depth of 3.5 m, estimated time 40 seconds." In response to noticing the notification, the remote operator may start to manually control the drilling process, whereby the control responsibility is automatically shifted to the remote operator. The control responsibility remains at the remote operator as long as he/she continues to manually control the drilling process, and upon stopping the manual control, the work machine automatically returns to the automated operation mode. As another option, the UI of the remote station may be provided with control means, such as a button, for the remote operator to take the manual control.

In order to allow the remote operator to manually control the work machine, a wireless control channel is established between the control station and the work machine. The UI of the remote station may be provided with a plurality of views, such as one or more camera views captured from the viewpoint of the work machine and one or more map views showing the location of the work machine in respect to the geography of the mine and/or the drilling pattern and/or other work machines operating in the same area. On the basis of these views and using the control means of the remote station, such as a joystick and/or a mouse and/or a touch pad and/or a touch display, the remote operator starts to operate the work machine manually over the difficult position.

The control signals of the control means are transmitted as control commands via said control channel to the work machine. The remote operator may continue to operate the work machine manually as long as necessary such that the difficult position has been passed. Then the remote operator may terminate the manual operation by disconnecting the control channel, whereupon the work machine automatically returns to continue the automated drilling process.

Instead of providing the remote operator with an option to manually control the operation of the work machine using the control means of remote station over the control channel, the remote controller may be provided with an option to select a predetermined operation to be carried out.

Thus, according to an embodiment, the manually assisted operation comprises determining one or more functionalities for assisting the operations of the work machine at said point; providing the remote operator with said one or more functionalities as options to select; in response to the remote operator selecting one of said functionalities, carrying out control operations according to the selected functionality at the work machine; and continuing the automated drilling process.

Herein, the work machine may be arranged, upon noticing that the operation is approaching a point corresponding to the region of interest in the reference data, to determine one or more functionalities that may assist the operations of the work machine in a difficult position. The remote operator may then be provided with said one or more functionalities as options to select, for example by displaying a notification on the UI of the remote station: "A point possibly comprising water approaching in 50 cm. Want to switch off suction?" The UI of the remote station may be provided with selection means, such as a button, for the remote operator to select at least one functionality to be carried out.

Herein, no wireless control channel needs to be established between the control station and the work machine, but the selection of the remote operator may be transmitted to the work machine along with other communication between the control station and the work machine. The work machine carries out the predetermined functionality selected by the remote operator as a part of the automated process and continues then the automated drilling process.

According to an embodiment, the control operations according to the selected functionality comprise at least one of the following:
   automatically switching off suction of drilling cuttings in response to the reference data indicating the drilling process of the hole being drilled approaching a point comprising water;
   reducing drilling feed power in response to the reference data indicating the drilling process of the hole being drilled approaching a void;
   adjusting drilling feed power and/or percussion to be suitable for expected type of rock material;
   changing the drilling control mode and/or the drilling control parameters according to the expected rock conditions.

Consequently, when a region of interest possibly having a major or a severe influence on the drilling process of the hole being drilled is detected in the reference data, the remoter operator may be provided with an option to control the drilling process appropriately by adjusting at least one parameter of the drilling process.

According to an embodiment, the control operations according to the selected functionality comprise changing the navigation route of the work machine in response to at least one of the following:
   detecting a forbidden area on a planned route;
   detecting the work machine to be too inclined;
   detecting a difficult position on a planned route.

Thus, in a manner similar to detecting possible difficulties in the drilling process, when the reference data comprises a region of interest, which may involve an obstacle for the movements of the work machine, the remoter operator may be provided with an option to change the navigation route accordingly. Such an option may also be provided if, for example, the work machine, such as a drilling rig, is in a too inclined alignment such that the work machine cannot be driven along the originally planned navigation route. A further example relates to detecting a difficult position, such as a tunnel wall or an edge of a bank, being close to the planned route, whereupon the remoter operator may be provided with an option to change the navigation route to avoid said position.

The manually assisted operations may further relate to supporting the work machine to be firmly in its operating position. For example, a drilling rig should be firmly supported in its operating position, possibly obtaining ground contact through one or more ground supports, before it can be safely and steadily operated.

Thus, according to an embodiment, the control operations according to the selected functionality comprise manually assisting in providing ground support of the work machine in response to at least one of the following:
   detecting the ground around the work machine to be too inclined or slippery to support;
   detecting the work machine to be too inclined to support;
   detecting at least one support of the work machine being incorrectly supported.

Herein, the work machine may observe the reference data relating to the ground around the work machine, and if a region of interest indicating the ground to be, for example, too inclined or slippery to support the work machine is detected, the remote operator may be provided with an option to manually assist in providing ground support of the work machine. In a similar manner, it may be detected that the work machine, such as a drilling rig, is too inclined to be supported or supporting the work machine has failed, the remote operator may again be provided with an option to manually assist in providing ground support of the work machine.

A further field of operation where the manually assisted operations may be provided to the operator is positioning the work machine, for example as described above in connection with the drilling apparatus having its booms and drilling unit each being positioned in their correct operating position.

Therefore, according to an embodiment, the control operations according to the selected functionality comprise manually assisting positioning the work machine and/or its sub-units in response to at least one of the following:
  obtaining a pre-warning of collision;
  detecting a feed beam touching ground;
  detecting a feed beam leaning on a tunnel wall;
  detecting at least one of the joints of the work machine not following correctly.

Herein, the pre-warning of collision may relate to a situation, where the work machine starts to operate in a difficult position such that there is a risk of a boom to collide into another part of the work machine, e.g. a cabin or the boom itself. The operator may manually assist e.g. by controlling one of the joints of the work machine to move to a position where the automated process may continue. This may also be the manually assisted operation, when it is detected at least one of the joints of the work machine does not follow correctly. If it is detected that the feed beam touching ground or leaning against a tunnel wall, this may be indicated to the operator, who then controls the feed beam to move to such position where the automated process may continue.

According to an embodiment, one or more sets of drilling parameters, drilling control modes and/or drilling control parameters are stored in a memory of the work machine. In the memory, each set of drilling parameters, a drilling control mode and/or a drilling control parameter may be linked to one or more drilling conditions, where such parameters or control modes are suitable to use. The drilling parameters, drilling control modes and/or drilling control parameters may be determined on the basis of at least one previously drilled hole, or they may be calculated using an appropriate algorithm.

According to an embodiment, in response to the reference data indicating the drilling process of the hole being drilled approaching a specific rock condition, the work machine is arranged to retrieve from the memory a set of drilling parameters, a drilling control mode and/or a drilling control parameter suitable for said drilling condition to be used in said control operations.

In a use case example, the work machine is in an automated process drilling rock type A with good drilling parameters (e.g. good penetration rate, low levels of vibrations). The used drilling parameters have been stored in the memory and linked to the rock type A. Next, the work machine moves to drill rock type B and makes changes to the drilling parameters. Later on, the drilling process moves back to rock type A. Now, upon the reference data indicating the drilling process of the hole being drilled approaches rock type A, the previously stored drilling parameters offering high penetration rate with low levels of vibrations for the rock type A can be retrieved from the memory.

Herein, the work machine may be arranged to send a notification to the remote station, the notification showing the stored drilling parameters for the rock type A and proving an option to take said drilling parameters in use. The remote operator may then select to use said parameters and give a user input via the UI of the remote station to the work machine for using said drilling parameters.

In a similar manner, when the work machine is operating in a mine, it may be arranged to store its navigation parameters together with corresponding propagation conditions, and when later on operating substantially in the same area, the stored parameters may be utilised. Thus, according to an embodiment, one or more sets of navigation parameters are stored in a memory of the work machine, said set of navigation parameters are linked to one or more propagation conditions, where such parameters are suitable to use, and in response to the reference data indicating the navigation route of the work machine approaching an obstacle, a set of navigation parameters suitable for propagation to be used in said control operations is retrieved from the memory.

According to an embodiment, the remote operator may be provided with an option to include his/her notes to the user interface view of the remote station. The note may relate to a certain event in the drilling process (e.g. detected water or fractioning) or to navigation (e.g. an area where manually assisted navigation is typically required) or to an operation or an observation made by the operator, and the operator may include a note, such as a text or a voice message, describing the event more in detail. The user interface of the apparatus may include a specific button ("event button") or any other input means for including the note relating an event.

In the previous embodiments, the reference data may, at its simplest, be based on data from only one previously drilled reference hole. The reference hole may be, for example, the latest drilled hole or a hole locating closest to the hole being drilled. The reference hole may also be any other previously drilled hole, selected for example from a field view of a drilling plan.

According to an embodiment, the reference data may be based on measurement data from a plurality of previously drilled holes comprising for example a row of reference holes, a fan of reference holes, any other part of the drilling pattern or the whole drilling pattern. Thus, the reference data may be based on measurement data from two or three previously drilled holes, for example.

The reference data may further be based on measurement data from one or more holes previously drilled using the same or another drilling rig, from one or more previously drilled exploration holes (e.g. boreholes), from analysis data of chippings, or from geological data obtained otherwise than by drilling, e.g. by scanning or imaging a bank or the ground, or by using a geological map or a mine map/scheme. If the measurement data is obtained otherwise than by drilling, then a previously drilled hole may be a virtual hole, which calculated and/or estimated on the basis of said measurement data.

A skilled person appreciates that any of the embodiments described above may be implemented as a combination with one or more of the other embodiments, unless there is explicitly or implicitly stated that certain embodiments are only alternatives to each other.

The various embodiments of the invention can be implemented with the help of computer program code that resides in a memory and causes the relevant apparatuses to carry out the invention. For example, a work machine may comprise circuitry and electronics for handling, receiving and transmitting data, computer program code in a memory, and a processor that, when running the computer program code, causes the machine to carry out the features of an embodiment.

Figure 3:
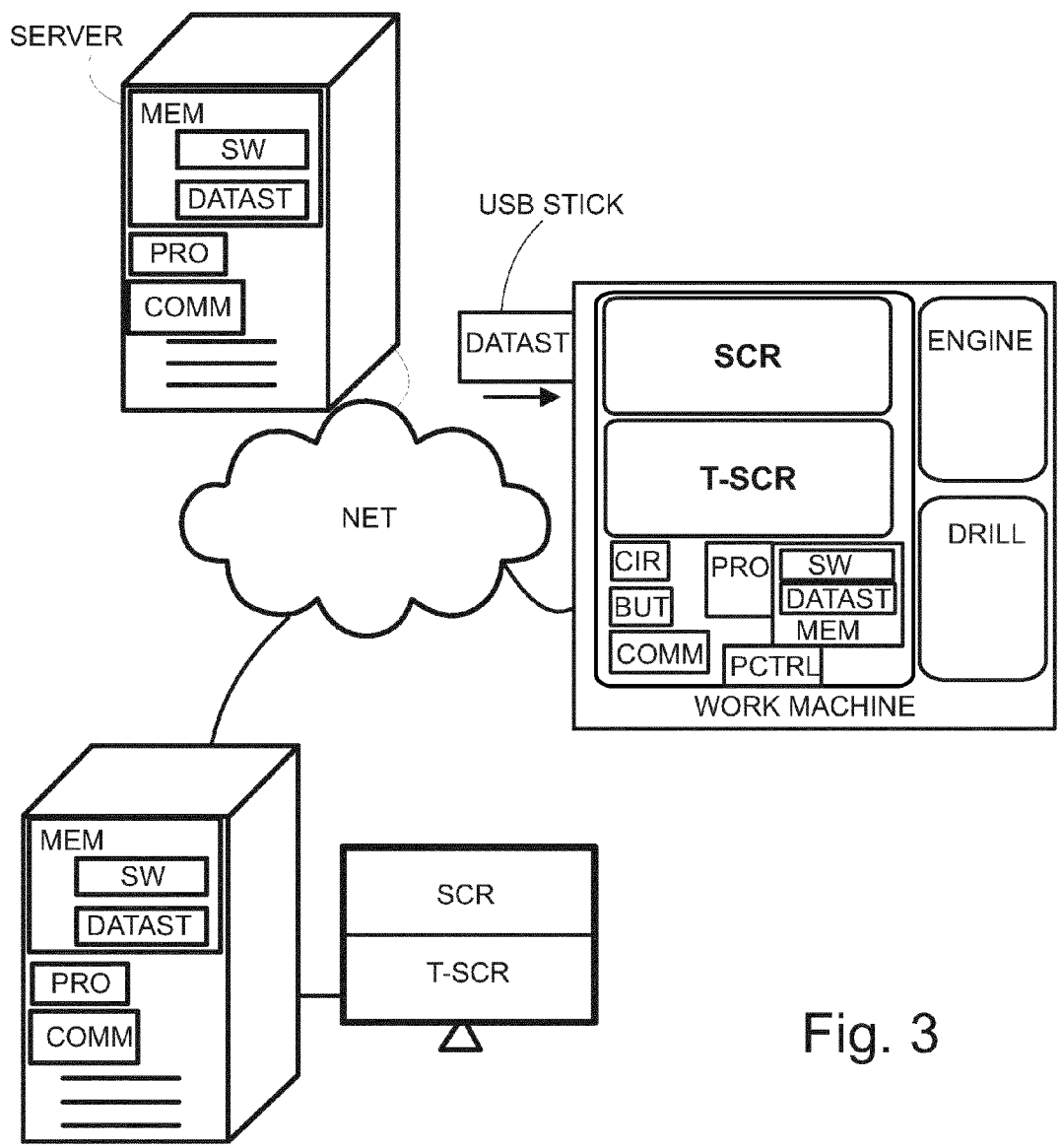
FIG. 3 shows a block diagram of a system for carrying out the control method of a work machine.

FIG. 3 shows a block diagram of a system for carrying out a control process of the work machine. The system comprises one or more processors PRO, and memory MEM. The processors and memory may be in one part of the system or distributed across different parts and different apparatuses. For example, a work machine control interface may have its own processor and/or memory, a computer connected to the work machine its own processor and memory, and other parts of the system their own. The memory MEM may comprise software SW executable on the processor PRO so that the system may display items to the operator via a screen SCR and accept input through buttons BUT, physical controls PCTRL like levers and joysticks, and/or through a touch screen T-SCR. A part or all of the steps of an embodiment may be carried out in software, and a part or all of the steps may be carried out by control circuitry CIR. The software may reside on a computer-readable non-transitory medium such as a USB stick or a data disc, and the computer program code is stored on said medium. Such a computer program product may be used to deliver the functionalities of the invention to a system by installation or by using the computer-readable medium directly for executing the program therefrom. The system may comprise communication modules COMM for sending and receiving data between the different parts and apparatuses of the system.

As a further aspect of the invention, there is provided a computer program product, stored on a non-transitory memory medium, comprising computer program code for carrying out a control process of a work machine, the computer program code which, when executed by a processor, causes the work machine to perform: obtaining, from at least one input, data determining operations of the work machine; generating a reference data based on the data determining previous operations of the work machine in substantially the same area; detecting a region of interest in the reference data; and controlling, in response to the work machine or its drilling process approaching a point corresponding to the region of interest in the reference data, the work machine to provide an operator with an option to manually assist the operations of the work machine at said point.

Figure 4:
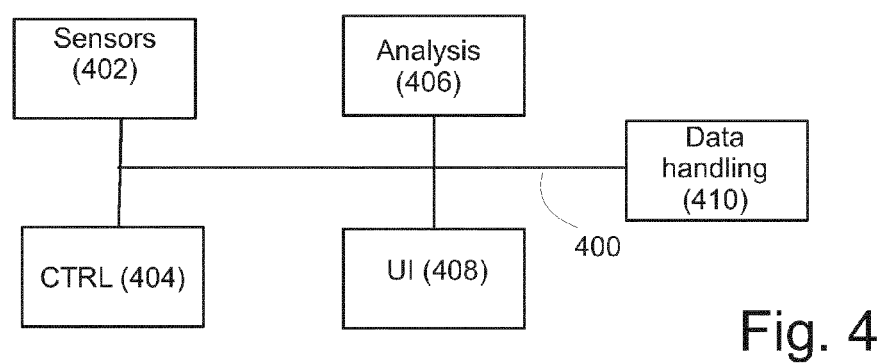
FIG. 4 shows an exemplified block diagram of co-functional modules according to an embodiment of the invention.

The various embodiments of the invention may be implemented as co-functional modules in the work machine, the modules being preferably replaceable as such. The modules may be implemented as hardware, software or a combination of them. FIG. 4 shows an exemplified block diagram of modules and their mutual communication via a communication bus 400. The individual sensors of the work machine are represented by the sensor module 402. The measurement data obtained from the sensors is communicated to the control unit module 404 and the analysis module 406 via the communication bus 400. The measurement data interpreted and analyzed by the analysis module 406 may be provided to the user interface module 408, whereas the user inputs obtained by the user interface module 408 are communicated to the control unit module 804 and/or the analysis module 406. The user interface module may further be connected to the remote station for sending/receiving data to/from the remote operator. The data handling module 410 creates and updates the reference data according to the inputs from the analysis module 406 and the user interface module 408.

It is obvious that the present invention is not limited solely to the above-presented embodiments, but it can be modified within the scope of the appended claims.

The invention claimed is:

1. A method for controlling an automated drilling process on a mining vehicle, the method comprising:
   obtaining, from at least one input, data describing current operation conditions of the mining vehicle;
   generating reference data based on data describing previous operation conditions of the mining vehicle in substantially a same area;
   detecting a region of interest in the reference data, wherein the region of interest represents any analysed data which may indicate difficulties in the drilling process of the mining vehicle in its current location; and
   controlling, in response to the drilling process approaching a point corresponding to the region of interest in the reference data, the mining vehicle to provide an operator with a notification of the approaching point corresponding to the region of interest and with an option to manually assist the drilling process of the mining vehicle at said point.

2. The method according to claim 1, further comprising controlling, in response to a manually assisted operation carried out by the operator being completed, the mining vehicle to continue the automated drilling process.

3. The method according to claim 1, wherein the manually assisted operation comprises, in response to providing said option to a remote operator, establishing a control channel between a control station and the mining vehicle; receiving manually submitted control commands via said control channel at the mining vehicle; and disconnecting said control channel such that the automated drilling process is continued.

4. The method according to claim 1, wherein the manually assisted operation comprises determining one or more functionalities for assisting the drilling process of the mining vehicle at said point; providing a remote operator with said one or more functionalities as options to select; in response to the remote operator selecting one of said functionalities, carrying out control operations according to the selected functionality at the mining vehicle; and continuing the automated drilling process.

5. The method according to claim 4, wherein the control operations according to the selected functionality comprise at least one of the following:
   automatically switching off suction of drilling cuttings in response to the reference data indicating the drilling process of the hole being drilled approaching a point comprising water;
   automatically moving a suction head up or down according to the expected rock conditions and/or expected points comprising water;
   reducing drilling feed power in response to the reference data indicating the drilling process of the hole being drilled approaching a void;
   adjusting drilling feed power and/or percussion to be suitable for expected type of rock material; and
   changing the drilling control mode and/or the drilling control parameters according to the expected rock conditions.

6. The method according to claim 1, wherein said manually assisted operation relates only to a sub-process of the automated drilling process, the method further comprising continuing other sub-processes of the automated drilling process of the mining vehicle while the operator carries out said manually assisted operation.

7. The method according to claim 1, wherein the data describing operation conditions of the mining vehicle is one or more of the following:
- measurement data obtained from one or more sensors of the mining vehicle;
- measurement data obtained from at least one other mining vehicle; and
- user data submitted by an operator of at least one mining vehicle describing operation conditions of an operating area and/or the mining vehicle.

8. A mining vehicle arranged to carry out an automated drilling process, the mining vehicle comprising:
- at least one input for obtaining data describing current operation conditions of the mining vehicle; and
- a control system arranged to generate reference data based on data describing previous operation conditions of the mining vehicle in substantially a same area, the control system being further arranged to detect a region of interest in the reference data, wherein the region of interest represents any analysed data which may indicate difficulties in the drilling process of the mining vehicle in its current location, and control in response to the drilling process approaching a point corresponding to the region of interest in the reference data, the mining vehicle to provide an operator with a notification of the approaching point corresponding to the region of interest and with an option to manually assist the drilling process of the mining vehicle at said point.

9. The mining vehicle according to claim 8, wherein the control system is further arranged to control, in response to a manually assisted operation carried out by the operator being completed, the mining vehicle to continue the automated drilling process.

10. The mining vehicle according to claim 8, wherein the control system is further arranged to establish a control channel between a control station and the mining vehicle; receive manually submitted control commands via said control channel from the remote control station; and disconnect said control channel such that the automated drilling process is continued.

11. The mining vehicle according to claim 8, wherein the control system is further arranged to determine one or more functionalities for assisting the drilling process of the mining vehicle at said point; provide a remote operator with said one or more functionalities as options to select; in response to the remote operator selecting one of said functionalities, carry out control operations according to the selected functionality; and continue the automated drilling process.

12. The mining vehicle according to claim 11, wherein the control operations according to the selected functionality comprise at least one of the following:
- automatically switching off suction of drilling cuttings in response to the reference data indicating the drilling process of the hole being drilled approaching a point comprising water;
- automatically moving a suction head up or down according to the expected rock conditions and/or expected points comprising water;
- reducing drilling feed power in response to the reference data indicating the drilling process of the hole being drilled approaching a void;
- adjusting drilling feed power and/or percussion to be suitable for expected type of rock material; and
- changing the drilling control mode and/or the drilling control parameters according to the expected rock conditions.

13. The mining vehicle according to claim 8, wherein said manually assisted operation relates only to a sub-process of the automated drilling process, and the control system is further arranged to continue other sub-processes of the automated drilling process of the mining vehicle while the operator carries out said manually assisted operation.

14. The mining vehicle according to claim 8, wherein the data describing operation conditions of the mining vehicle is one or more of the following:
- measurement data obtained from one or more sensors of the mining vehicle;
- measurement data obtained from at least one other mining vehicle; and
- user data submitted by an operator of at least one mining vehicle describing operation conditions of an operating area and/or the mining vehicle.

15. A computer program product, stored on a non-transitory memory medium, comprising computer program code for carrying out a control process of a mining vehicle, the computer program code which, when executed by a processor, causes the mining vehicle to perform:
- obtaining, from at least one input, data describing current operation conditions of the mining vehicle;
- generating reference data based on the data describing previous operation conditions of the mining vehicle in substantially the same area;
- detecting a region of interest in the reference data, wherein the region of interest represents any analysed data which may indicate difficulties in the drilling process of the mining vehicle in its current location; and
- controlling, in response to the drilling process approaching a point corresponding to the region of interest in the reference data, the mining vehicle to provide an operator with a notification of the approaching point corresponding to the region of interest and with an option to manually assist the drilling process of the mining vehicle at said point.

* * * * *